United States Patent [19]

Elinsky

[11] Patent Number: 4,847,099
[45] Date of Patent: Jul. 11, 1989

[54] PROCESS FOR DEFATTING MEATS

[76] Inventor: Stephen E. Elinsky, 149 Chandler Dr., West Chester, Pa. 19380

[21] Appl. No.: 141,964

[22] Filed: Jan. 11, 1988

[51] Int. Cl.⁴ ................................................. A23L 1/31
[52] U.S. Cl. .................................... 426/233; 426/417; 426/510; 426/523
[58] Field of Search ............... 426/233, 417, 509, 510, 426/511, 523

[56] References Cited

U.S. PATENT DOCUMENTS

| | | | |
|---|---|---|---|
| 1,214,392 | 1/1917 | Frescott | 426/509 |
| 4,480,993 | 11/1984 | Guiriec | 426/417 |
| 4,528,975 | 7/1985 | Wang | 426/510 |

Primary Examiner—George Yeung
Attorney, Agent, or Firm—Laurence A. Weinberger

[57] ABSTRACT

An apparatus and method for defatting and cooking meats which can be used in home and commercial kitchens whereby animal fats are removed during cooking without the use of high temperatures which may result in the formation of carcinogenic compounds. The defatting and cooking is accomplished by suspending the meat in a partially closed container above boiling water where it is exposed to steam. The meat is heated by the heat of condensation of the steam until cooked. During the cooking the temperature of the medium surrounding the meat within the container is monitored and regulated. While cooking, the animal fats from the meat are free to drip off into the boiling water below the meat.

3 Claims, 1 Drawing Sheet

PROCESS FOR DEFATTING MEATS

BACKGROUND OF THE INVENTION

This invention relates in general to the field of food preparation and more particularly to a method and apparatus for cooking animal meats for human consumption while removing much of the naturally occuring fat in the meat.

In recent years a great deal of attention and scientific and medical inquiry has been devoted to the study of the close link between the level of animal fats consumed in the typical human diet and the levels of fatty acids and cholesterol present in the blood. The motivation for these studies has been the concern that incidence of diseases of the blood vessels such as coronary heart disease and arteriosclerosis is associated with raised levels of fatty acids and cholesterol in the blood stream. As a consequence of these studies and concerns, medical scientists have been advising in both the scientific and popular press that humans reduce their consumption of dietary animal fat.

The usual suggestion for reducing the consumption of dietary animal fat is to stop eating meats high in such fats. While such a prohibition is usually directed to red animal meats, it is known that other meats including some derived from ocean animals contain high levels of cholesterol. Such a change in eating habits for a human population raised for millenia on animal meats has proved to be disconserting at best, and impossible to effectively practise at worst.

One reason that abstinence is suggested as the best policy for avoiding a high dietary intake of fats is that the typical methods used to cook meat result in much of the fat being retained in the meat. Despite the nuances found in all cook books, fundamentally most meats are cooked by one of two methods. The first method consists of plaing the surface of the meat in contact with a hot, thermally conducting, medium which is itself heated by an external source. Frying meat directly on a hot metal surface is a typical example of this method although sometimes water or oils are used as ancillary heat transfer aids. This method may result in the external surface of the meat becoming seared which further retards the ability of the fats to flow out of the meat. In addition, the usual cooking procedure involves turning the meat over several times so that all surfaces become seared. Even if no sealing of the meat surface to the flow of fat occurs, in this first general method the meat continues to sit and cook in its own fat. As a result, a substantial amount of the fat is reabsorbed and remains in the meat.

In the second general method of cooking meat, the meat surface is directly exposed to a radiant source of heat. Typically, the source emits in the infrared region of the electromagnetic spectrum although microwave radiation may also be used. The temperature may be very high as in broiling, or somewhat lower as in baking or roasting. With high temperatures, the meat surface is seared, thereby forming an effective barrier to the flow of fats from within the meat out through the surface. With lower temperatures and their longer cooking times, the meat surface is dried out and again acts as a barrier to the free flow of the internal fats out of the meat. The net result is that substantial amounts of the natural fats are retained in the meats.

Recently, a further concern has been raised about the manner in which most meats are cooked with the discovery that the use of high cooking heats results in the formation of a range of compounds which may possibly be mutagenic and/or carcinogenic. At the present time, most of these concerns center around the use of the very high surface temperatures found in direct frying and broiling. The compounds causing concern also seem to be created by the heat acting on at least some of the constituents of the fats. Whether such concerns will be raised about the use of lower heats is unknown at this time.

While not used frequently to cook meats, there are three other cooking methods which use water and steam. These methods differ substantially from the method of this invention. The first, pressure cooking, is accomplished by placing the food to be cooked in a completely sealed vessel containing a quantity of water. The food inside the vessel may or may not be initially placed in the water solution. As the vessel is heated, the water first turns to steam, and then the steam is heated to higher and higher temperatures. The high steam temperatures result in internal vapor pressures well in excess of atmospheric pressure. Temperatures significantly higher than 100 degrees Celcius are reached. The purpose of pressure cooking is to achieve these higher temperatures in order to reduce the cooking time.

A second method, poaching, consists of placing the item to be cooked in hot or boiling water. The cooking temperature may be that of boiling water or lower, but, once again, if this method is used with fatty meats, the meat sits and cooks in its own fats and is free to reabsorb those fats. In addition, the hot water in contact with the food acts to dissolve and remove other compounds including the flavor compounds from the food.

In the third method, steaming, food is placed above boiling water in a semi-closed vessel. No attempt is made to monitor the vapor pressure or the temperature around the food and usually as much steam is used as can be generated by the heating source and water volume. In addition, the vessel may be sufficiently closed so that there is a slight rise in internal pressure and a corresponding increase in temperature above 100 degrees Celcius.

In general, the above cited three methods are used to cook vegetables, although certain fish, such as salmon, are poached and some shellfish are steamed. However, the general cooking literature does not recognize or suggest that these methods be used to cook meats. The method of the present invention teaches how to take advantage of regulated hot steam to cook and defat meats in a way unanticipated and unrecognized by the prior cooking art.

SUMMARY OF THE INVENTION

The present invention relates generally to the art of cooking meats and, more particularly, is directed to a method and apparatus which yields meat from which a significant amount of fat has been removed. It is an object of the present invention to eliminate the disadvantages of the known processes for cooking meat and to provide a process and equipment for cooking meats which makes it possible to remove significant quantities of fat from the meat, to keep the meat moist and tender while cooking, to improve the flavor of the cooked meat, and to utilize a significantly lower temperature in the cooking process than conventionally used.

To these ends, the invention involves a process whereby the meat to be cooked is suspended above a volume of water in an appropriate cooking vessel. The water is heated to the boiling point and steam rising from the water is allowed to surround the meat to be cooked. It is important that the meat not be in direct contact with the boiling water. The vessel containing the meat and boiling water is covered to prevent the too rapid escape of the steam. However, it is an important feature of the invention that sufficient means of escape are provided for the excess steam so that the internal pressure in the vessel never significantly exceeds atmospheric pressure. In addition, the temperature of the atmosphere surrounding the meat within the vessel is monitored and regulated. The temperature regulation is achieved by regulating the heat input to the vessel. In accordance with the features of this process, the meat is actually heated by the heat of condensation given up by the steam as it contacts the cooler meat and condenses.

It is a principle feature of this process that the meat surface is never contacted by a source of heat in excess of approximately 100 degrees Celcius which is the approximate temperature of water steam at atmospheric pressure. In this process the steam acts to convey the heat for cooking to the meat. In addition, the steam keeps the surface of the meat from becoming dry. Thus, the surface of the meat is neither seared nor dried out, and it therefore remains porous allowing for the continued flow of fats out of the meat.

As the meat is heated, the fats, which generally have a melting point below the steam temperature, flow out of the meat and are free to drip into the boiling water below. As long as the water is free boiling at atmospheric pressure, the temperature of the water will remain at approximately 100 degrees Celcius. The fats, which have a higher boiling point than water, will remain in the boiling water and will not vaporize and surround the meat with fat vapors. Thus, fats are removed from the meat while cooking and are trapped in the water. In this manner, the method of this invention leads to a cooked meat product which is lower in fat than if the meat was cooked by conventional methods.

In accordance with the features of this process, it is neither necessary nor desireable to allow the temperature of the atmosphere within the vessel to rise above 100 degrees Celcius, and, in fact, it is desireable to keep the temperature as low as possible consistent with that required to inhibit or kill the microorganisms found in various meat products. Thus the temperature at the coolest part of meat being cooked must reach that temperature necessary to inhibit or kill the microorganisms, and, generally, it is necessary to hold that temperature for some period of time. Cooking at higher temperatures or for too lengthy periods usually results in degradation of the meat product. The process of this invention allows close monitoring and regulation of the cooking environment so that over-cooking does not occur. To achieve this regulation a temperature sensing element is introduced into the cooking atmosphere at the surface of the meat. While the meat is cooking, the temperature is thus monitored. It is a further object of this invention that the meats be held in an atmospheric cooking environment as close to the final internal meat temperature that is desired as possible. If the temperature needs to be raised, the cook can raise the rate of heat input thereby increasing the amount of steam generated. Conversely, if the temperature is too high, the cook can reduce the rate of heat input.

While the temperature can be thus controlled in this process, the total cooking time, that is the time to bring the coolest part of the meat up to a given temperature and the time it should be held there, will be a function of the original temperature of the meat used and will thus vary. Obviously meats which are cooler initially will require longer time to cook. The following is a summary from the general cooking literature of recommended temperatures which should be achieved in the coolest part of the meats in order to achieve proper cooking:

| | |
|---|---|
| Beef Rare | 60 Degrees Celcius |
| Beef Medium | 70 Degrees Celcius |
| Veal | 77 Degrees Celcius |
| Beef Well Done | 77 Degrees Celcius |
| Lamb | 80 Degrees Celcius |
| Poultry | 85 Degrees Celcius |
| Salmon | 60-70 Degrees Celcius |

It is a further feature of the method of this invention, that a more natural flavor and texture of the cooked meat is achieved. This occurs for three reasons. First, new chemical compounds created by higher temperatures acting on the fats and other food constituents are not created. Absent, for instance, is the burnt or charred flavoring some people like so well on their steaks or chicken. Second, the lowered fat levels yield a less greasy tasting meat, and the natural taste elements are not obscured by the taste of the fats. Third, because the meat is heated and cooked by the heat of condensation of water vapor on its surface, the resulting moisture keeps the meat from drying out so that it retains its natural juiceiness and tenderness.

DESCRIPTION OF THE PREFERRED EMBODIMENTS OF THE INVENTION

Figure 1:
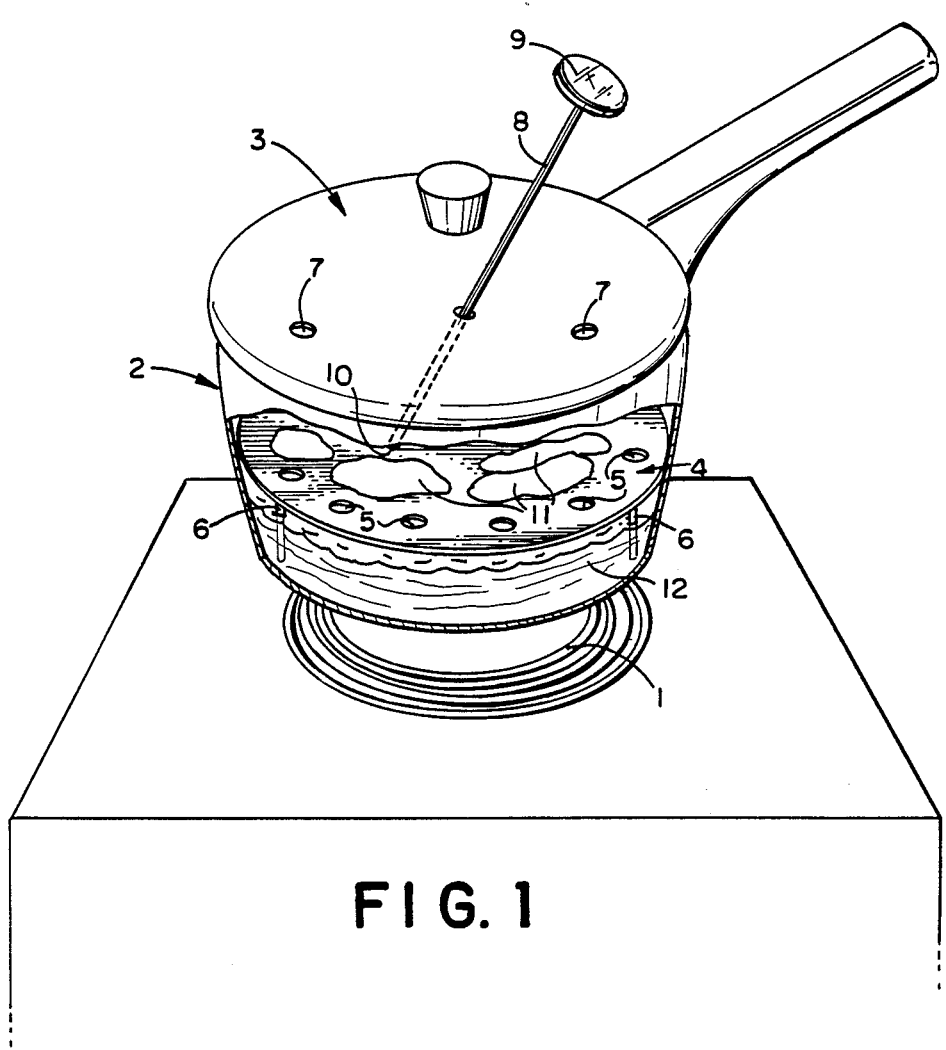
FIG. 1 is a schematic cross sectional representation of the apparatus employed in practicing the present invention.

Although specific terms are used in the following description for the sake of clarity, these terms are intended to refer only to the particular structure of the invention selected for illustration in the drawings, and are not intended to define or limit the scope of the invention. The inventive process described above can be practiced using equipment working discontinuously or by equipment working continuously. The accompanying drawings show equipment with which the process may be employed working discontinuously or by repetitive batches.

Refering now to FIG. 1, it can be seen that a pan 2 is shown located above a heating source 1. Typically the heating source 1 will be a gas flame or electric heating element. The heating source 1 is capable of regulation of its heat output.

The sides of pan 2 typically are of a height less than the diameter of the pan, such as is found in a conventional frying pan. However, the height of the sides must be sufficient so that after the placement inside the pan 2 of a metal support/rack 4 of approximately one inch or more in height, measured from the bottom of its support legs to its surface, a sufficient open/free space is left above the support/rack 4 so that the meat 11 to be cooked can be placed upon the support/rack 4 without contacting the lid 3 when the lid 3 is placed upon the pan 2. The pan 2 may be of any diameter which can be heated satisfactorily by the heating source 1 and which is large enough to contain the meat 11 without the meat contacting the side walls of the pan 2.

A support/rack 4 with a top member capable of supporting the meat is provided with a plurality of apertures 5 in its surface. The apertures 5 are of sufficient size and number to allow the free flow of hot water vapor or steam upwards through them and the free flow of melted fat downwards through them. The support/rack 4 is further provided with support means 6 such that the meat supporting top member of the support/rack 4 is held approximately one half to one inch from the bottom of the pan 2. Generally a round support/rack 4 would be used in a round pan 2.

A lid 3 for the pan 2 is provided which fits snugly within pan 2. However, it is important that the spacing or seal between the lid 3 and pan 2 allow some passage of steam or hot water vapor. The lid 3 contains two or more apertures 7 about the center of the lid 3 one of which is of sufficient diameter to allow passage of a thermometer stem 9. The other aperture 7 is of sufficient diameter to allow steam to escape so that the pressure inside the closed pan when cooking does not exceed one atmosphere. The lid 3 may also be provided with a plurality of other apertures which can be covered or uncovered as needed.

To practice the method of this invention, the rack 4 is placed in the pan 2. Water 12 is poured into the pan 2 to a depth of approximately one-half inch. However, the depth of the water may vary depending upon the length of cooking cycle. The water level must not reach the bottom edge of the support/rack 4 because a space for the free rise of hot water vapor or steam is essential between the top level of the water 12 and the bottom edge of the support/rack 4. The meat 11 to be cooked is placed upon the support/rack 4. The pan 2 is placed upon the heat source 1, and the heat source 1 is turned to its hottest setting. As soon as the water boils, the lid 3 is placed on the pan 2, and the heat setting of heat source 1 is adjusted. A cooking thermometer 9 of a kind readily purchased in most stores selling cooking supplies is placed through one of the apertures 7. The measuring tip 10 of the thermometer 9 is so placed so as to measure the ambient temperature of the vapor atmosphere around the meat. The pan can either be placed on heating source 1 before the meat and water are added to the pan, in which case heat source 1 should be initially off, or the pan can be placed on the heat source 1 anytime after the water is added. However, under no circumstances should the pan 2 be placed on a hot heating source 1 before water 12 is added since heat may be conducted directly through the metal of the pan 2 and support/rack 4 to the meat 11. Typically, the heat is not turned on until after the lid 3 is placed on the pan 2 and the thermometer 9 is inserted through one of the apertures 7.

Sufficient heat is applied by means of heating source 1 to maintain vigorous boiling so that the meat is surrounded at all times by excess hot water vapor or steam as evidenced by a steady stream of steam excaping from the aperatures 7. To regulate the volume of steam escaping the cook may reduce or increase the heat flux from heating source 1. The cook observes thermometer 9 until the desired temperature is reached. This temperature must be above the final interior meat temperature desired. To keep the temperature from rising above that desired, the cook must usually reduce the heat flux flowing from heat source 1 into pan 2. Typically, the heat source 1 must either be lowered from its highest setting, briefly turned off, or the pan removed temporarily from the heat source. The cook intermittently monitors the temperature reading on the thermometer 9 for the entire cooking time, and may lower it as above, or raise it by increasing the heat flux from source 1 by turning the heat to medium or high setting.

The length of time the meat is cooked will depend on the mass of the meat and its initial temperature. A longer cooking cycle will require more water. Typically, a quantity of meat sufficient to cover the entire support/rack in an average frying pan which is removed from the refrigerator immediately prior to cooking, takes approximately 8-12 minutes to fully cook to taste.

Once the meat is cooked, the remaining water 12 containing the melted fats should be discarded before cooking any more meat. Alternatively, a separator may be used to separate the fat from the other juices in the residual water. The juices may be used in soups or gravies and the fats discarded.

A batch process has been described, but the method could also obviously be practiced on a continuous basis with appropriate equipment.

Although the present invention has been described with reference to the particular embodiments herein set forth, it is understood that the present disclosure has been made only by way of example and that numerous changes in the details of construction may be resorted to without departing from the spirit and scope of the invention. Thus the scope of the invention should not be limited by the foregoing specification, but rather, only by the scope of the claims appended hereto.

What is claimed is:

1. A process for defatting meat while cooking comprising the steps of placing in an open topped container suitable for heating a rack consisting of several support means which hold a support surface, in which there are a plurality of apertures, sufficiently above the bottom of the container so that a volume of water can be added to the container without the water contacting the bottom of the supporting surface;

placing a sufficient volume of water in the container so that it will not be boiled away during the time of the cooking process and also so that there is a space between the surface of the water and the bottom of the supporting surface of the rack;

placing the meat to be cooked upon the surface of the rack;

applying heat by a heating means to the exterior of the container until the water boils;

placing a cover over the open top of the container which cover does not entirely seal the container but allows venting so that the pressure inside the container does not increase;

placing a temperature measurement device in contact with the upper surface of the meat so that the temperature measurement device indicates the ambient temperature at the surface of the meat;

raising the ambient temperature around the meat surface to a predetermined level by the steam generated from the boiling water;

heating the meat by the heat of condensation of the steam;

adjusting the heat input so that the ambient temperature at the meat surface stays near the desired level;

monitoring the ambient temperature at the meat surface throughout the cooking cycle and adjusting the heat input as necessary so that the temperature stays near the desired level;

allowing the fat to drip off the meat and through the aperatures in the rack surface into the boiling water;

continuing heating and cooking the meat until done;

removing the cooked meat from the rack;

discarding the fat and retaining the water containing the meat juices.

2. A process for defatting meat while cooking comprising:

(a) suspending the meat on an open rack above boiling water in an enclosure vented to the atmosphere;

(b) raising the ambient temperature around the meat surface to a predetermined level by the steam generated from the boiling water;

(c) heating the meat by the heat of condensation of the steam;

(d) monitoring the ambient temperature around the meat surface throughout the cooking cycle and adjusting the heat input as necessary so that the ambient temperature stays near the desired level;

(e) allowing the fat to drip off the meat and rack into the boiling water;

(f) continuing heating and cooking the meat until done; and (g) removing the cooked meat from the rack.

3. The process of claim 2 further comprising separating the fat from the heating water which contains the meat juices and using the water for flavorings.

* * * * *